(12) United States Patent
Lewis et al.

(10) Patent No.: US 9,489,454 B1
(45) Date of Patent: Nov. 8, 2016

(54) AUTOMATIC GENERATION OF PLAYLISTS FROM DIGITAL CONTENT EMBEDDED ON THIRD-PARTY SERVICES

(71) Applicant: Google Inc., Mountain View, CA (US)

(72) Inventors: Justin Lewis, Marina del Rey, CA (US); Ruxandra Georgiana Davies, Santa Monica, CA (US)

(73) Assignee: Google Inc., Mountain View, CA (US)

( * ) Notice: Subject to any disclaimer, the term of this patent is extended or adjusted under 35 U.S.C. 154(b) by 323 days.

(21) Appl. No.: 14/280,457

(22) Filed: May 16, 2014

(51) Int. Cl.
*G06F 17/00* (2006.01)
*G06F 17/30* (2006.01)

(52) U.S. Cl.
CPC ... *G06F 17/30772* (2013.01); *G06F 17/30017* (2013.01); *G06F 17/30053* (2013.01)

(58) Field of Classification Search
CPC .................. G06F 17/30772; G06F 17/30017; G06F 17/30053
USPC .......................................... 707/736, 791, 610
See application file for complete search history.

(56) References Cited

U.S. PATENT DOCUMENTS

| | | | | |
|---|---|---|---|---|
| 2008/0294711 A1* | 11/2008 | Barber | .................. | G06Q 30/02 709/201 |
| 2010/0082975 A1* | 4/2010 | Metke | ..................... | G06F 21/33 713/157 |
| 2010/0088327 A1* | 4/2010 | Holm | ................ | G06F 17/30053 707/758 |
| 2010/0174608 A1* | 7/2010 | Harkness | ................ | G06F 21/10 705/14.53 |
| 2011/0246294 A1* | 10/2011 | Robb | ..................... | G06Q 30/00 705/14.52 |
| 2011/0295661 A1* | 12/2011 | Dodge | ............... | G06Q 30/0241 705/14.4 |
| 2012/0117026 A1* | 5/2012 | Cassidy | ............ | G06F 17/30053 707/634 |
| 2013/0347022 A1* | 12/2013 | Bates | ................ | H04N 21/25816 725/25 |
| 2014/0006138 A1* | 1/2014 | Black | .................. | G06Q 30/0251 705/14.41 |
| 2014/0075314 A1* | 3/2014 | Bachman | .............. | G06F 3/0486 715/716 |
| 2014/0130144 A1* | 5/2014 | Yang | ....................... | H04L 67/02 726/8 |

* cited by examiner

*Primary Examiner* — Phong Nguyen
(74) *Attorney, Agent, or Firm* — Fenwick & West LLP (57) ABSTRACT

A content hosting service automatically creates a playlist of embedded content items based on the content items embedded by a third-party service. The playlist is associated with a channel on the content hosting service that is managed by the third-party service. In operation, each time a content item is embedded on a third-party service, the content hosting service determines whether a channel is associated with the third-party service. When a channel is found to be associated with the third-party service, the content item embedded on the third-party service is inserted into a playlist of embedded content items included in the channel. The playlist can be presented to viewers of the channel directly on the content hosting service.

22 Claims, 5 Drawing Sheets

AUTOMATIC GENERATION OF PLAYLISTS FROM DIGITAL CONTENT EMBEDDED ON THIRD-PARTY SERVICES

BACKGROUND

Field

Disclosed embodiments generally relate to the field of distributing digital content, such as video and audio content, and, in particular, to automatically generating playlists from digital content embedded on third-party services.

Description of the Related Art

Content hosting services host and deliver content items, such as videos, to users. The content items hosted by a content hosting service may be viewed directly on a platform managed by the content hosting service. Alternatively, a third party may embed a content item hosted by the content hosting service on its own platform. A user may, therefore, view the embedded content on the third party's platform. The content hosting service manages the delivery of content items that are viewed directly on the content hosting service's platform as well as the delivery of embedded content items that are viewed on the third party's platform.

SUMMARY

Content items hosted by a content hosting service that are embedded on third-party services can be organized into playlists on the content hosting service. Each playlist of embedded content items includes content items that have been embedded on a third-party service. Furthermore, each playlist is associated with a channel within the content hosting service that is associated with the third-party service. Therefore, viewers of the channel are able to view and consume the embedded content items directly on the content hosting service.

The content hosting service automatically creates a playlist that includes content items embedded on the third-party service. The playlist is included in a channel that is maintained by a user of the content hosting service and who is also associated with the third-party service. Such a channel is determined to be affirmatively associated with the third-party service—that is, the connection between the channel owner and the third-party site has been confirmed to the satisfaction of the implementer. In operation, each time a content item is embedded on a third-party service, the content hosting service identifies a channel in the content hosting service that is affirmatively associated with the third-party service. When such a channel is found, the content item embedded on the third-party service is inserted into a playlist of embedded content items included in the channel. The playlist can be presented to viewers of the channel directly on the content hosting service.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

DETAILED DESCRIPTION

The computing environment described herein enables automatic generation of playlists based on videos embedded on third-party services that are associated with video channels available on a content hosting service. The figures and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

Figure 1:
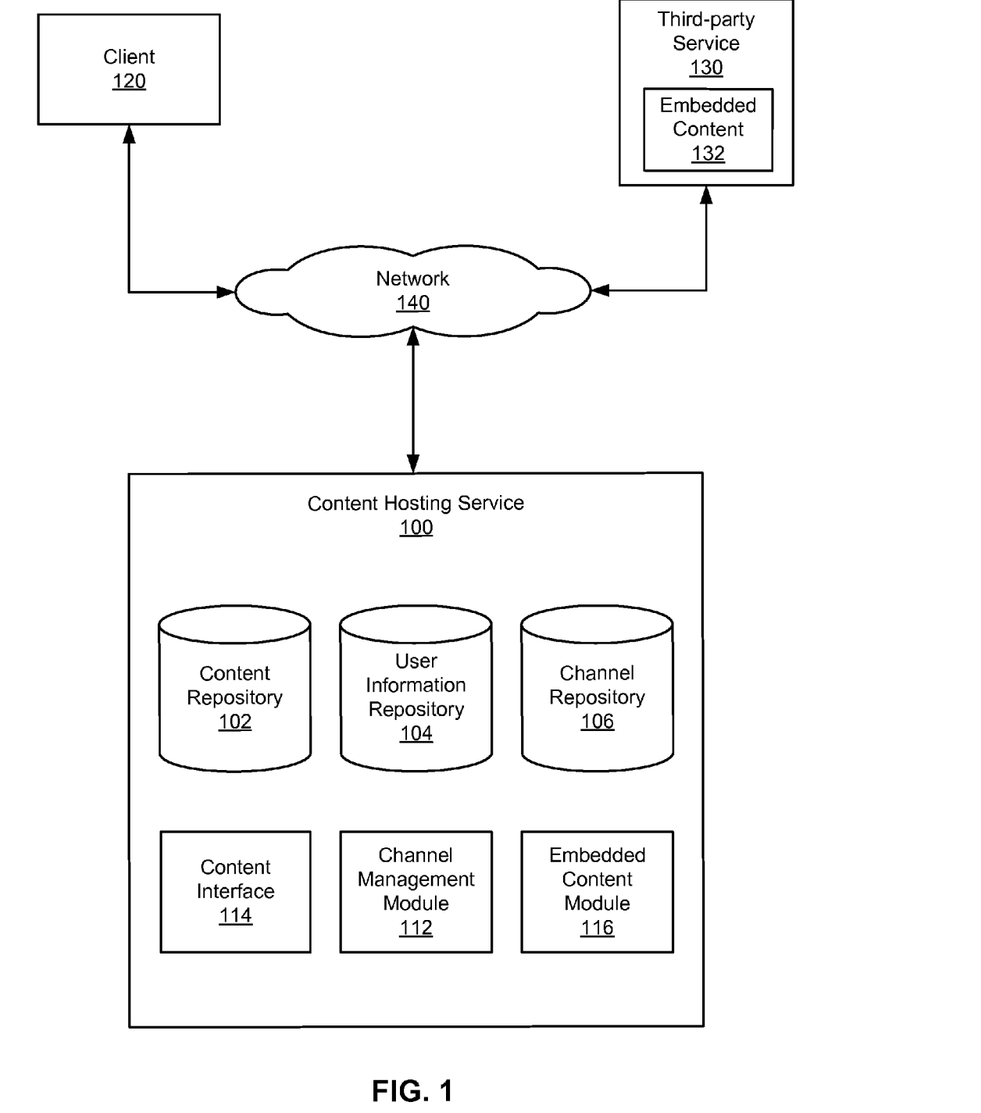
FIG. 1 illustrates a system for generating playlists from videos embedded on third-party platforms according to one embodiment.

FIG. 1 illustrates a system for generating playlists from videos embedded on third-party platforms according to one embodiment. As shown, the system includes a content hosting service 100, a client 120, and a third-party platform 130 having embedded content 132. The content hosting service 100, client 120, and third-party service 130 are communicatively coupled to each other via a network 140.

The client 120 accesses digital content through the network 140 and presents digital content to a user. Presenting digital content includes playing a video or audio file as well as displaying an image or animation. In one embodiment, the client 120 is a computer, which is described further below with respect to FIG. 5. Example client devices 110 also include a desktop, a laptop, a tablet, a mobile device, smartphone, a smart television, and a wearable device. Using the client 120, a user may upload and manage digital content on the content server 120, which includes creating and modifying playlists of digital content. The client 120 may include software, such as a web browser or other application for viewing digital content. The client 120 may also include software such a video player, an audio player, or an animation player to support presentation of embedded digital content. The client 120 may view content on the content hosting service 100 either directly or via a third-party service 130 regardless of what user or device provided the content to the hosting service 100, subject to any content-related or user-related permissions settings implemented by content hosting service 100 or content providers.

The network 140 enables communications among the entities connected to them through one or more local-area networks and/or wide-area networks. In one embodiment, the network 140 is the Internet and uses standard wired and/or wireless communications technologies and/or protocols. The network 140 can include links using technologies such as Ethernet, 802.11, worldwide interoperability for microwave access (WiMAX), long term evolution (LTE), 3G, 4G, digital subscriber line (DSL), asynchronous transfer mode (ATM), InfiniBand, and/or PCI Express Advanced Switching. Similarly, the networking protocols used on the networks 170, 160 can include multiprotocol label switching (MPLS), transmission control protocol/Internet protocol (TCP/IP), User Datagram Protocol (UDP), hypertext transport protocol (HTTP), simple mail transfer protocol (SMTP), and/or file transfer protocol (FTP).

The data exchanged over the network 140 can be represented using technologies and/or formats including hypertext markup language (HTML), extensible markup language (XML), and/or JavaScript Object Notation (JSON). In addition, all or some of the transmitted data can be encrypted using conventional encryption technologies such as the secure sockets layer (SSL), transport layer security (TLS), virtual private networks (VPNs), and/or Internet Protocol security (IPsec). In another embodiment, the entities use custom and/or dedicated data communications technologies instead of, or in addition to, the ones described above.

The content hosting service 100 stores digital content items and serves these content items to viewing users of client devices 120. In the illustrated embodiment, the content hosting service 100 includes a content repository 102, a user information repository 104, a channel repository 106, a content interface 114, a channel management module 112, and an embedded content module 116.

Many conventional features, such as firewalls, load balancers, application servers, failover servers, network management tools and so forth are not shown so as not to obscure the features of the system. A suitable service for implementation of the content hosting service 100 is the YOUTUBE™ service, found at www.youtube.com; other content hosting services are known as well, and can be adapted to operate according to the teaching disclosed here. The term "service" in the context of the content hosting service 100 represents any computer system adapted to serve content using any internetworking protocols, and is not intended to be limited to content uploaded or downloaded via the Internet or the HTTP protocol. The term "module" refers to computer program logic for providing a specified functionality. A module can be implemented in hardware, firmware, and/or software. A module is typically stored on a computer-readable storage medium such as storage device, loaded into a memory, and executed by a processor. In general, functions described in one embodiment as being performed on the server side can also be performed on the client side in other embodiments if appropriate. In addition, the functionality attributed to a particular component can be performed by different or multiple components operating together.

The content items served by the content hosting service 100 may include video, audio, or a combination of video and audio. Alternatively, a content item may be a still image, such as a JPEG or GIF file or a text file. A content item may be uploaded to the content hosting service 100 by the users of the client devices 120 or may be acquired from professional content creators, such as production companies, record labels, and publishers. Client devices 120 may access the content items directly on the content hosting service 100. Alternatively, client devices 120 may access the content items via third-party services, such as the third-party service 130, that embed links to the content items on their platforms. When a client 120 accesses an embedded link on a third-party service, the content hosting service 100 serves the content item to the client device 120. In one embodiment, the third-party service may be a website. In an alternate embodiment, the third-party service may be a native desktop or mobile application.

In some embodiments, content hosting service 100 includes a user information repository 104, which stores a user profile associated with each user who uploads videos to and/or accesses videos served by the content hosting service 100 via a client device 120. A user profile includes identification information associated with the user as well as access data related to the user's activities on the content hosting service 100. In particular, the access data indicates whether a user watched a video, skipped a video, scrolled up or down through a web page including a video, shared a video with other users, added a video to a playlist, flagged a video, blocked a video from a playlist or a collection of videos, favorited a video, gave a video a favorable rating (e.g. liked a video using a FACEBOOK™ account or +1'd a video using a GOOGLE+™ account), or gave a video an unfavorable rating (e.g. "thumbs down"). In one embodiment, the content hosting service 100 provides the users with the opportunity to opt-out of having the users' access data collected and/or shared with other modules in the content hosting service 100 or other services.

The content hosting service 100 also includes a content repository 102 that stores the content items hosted and served by the content hosting service 100. For each content item, the content repository 102 stores both the content item and metadata associated with the content item. The metadata includes a unique identifier associated with the content item, the content item's source (e.g., an uploader name and an uploader user identifier), and attributes of the content item (e.g., a title, a description, a file size, a file type, a frame rate, a resolution, an upload date).

Content items in the content repository 102 are accessible via the content interface 114 included in the content hosting service 100. In operation, to access a given content item, the client 120 accesses the URI corresponding to the content item. The URI corresponding to the content item may be a URL, a URN, or some other form of pointer or address. In one embodiment, the URI includes a domain associated with the content hosting service 100 and the content identifier associated with the content item. Based on the content identifier, the content interface 114 retrieves the content stored in the content repository 102 that is associated with the identifier and presents the content. The content interface 114 may include a video or audio player or an image slideshow viewer, for example. In some embodiments, advertisements are also provided to the client device 120 before, during or after the requested content.

The content interface 114 may additionally retrieve metadata associated with the content item from the content repository 102 and present the metadata along with the content item. The presented metadata includes the title of the content item, the upload date of the content item, and an identification of a user who uploaded the content item. The content interface 114 may also present additional content items for selection and subsequent viewing. The presentation of the additional content item may include a title of the content item and a preview thumbnail retrieved from the content repository 102. The additional content items may be related to the content item currently being presented. For example, the additional content items may have content similar to the content of the content item currently being played or may be uploaded by the same user.

Each content item in the content repository 102 may be associated with one or more channels—each channel being a collection of curated content items. A channel can include content items available from a common source or content items having a common topic or theme. In various embodiments, the content items included in a channel can be content items chosen by a user of the content hosting service 100, such as the channel owner, content items made available by a user of the content hosting service 100, content items uploaded by a user of the content hosting service 100, content items chosen by a content provider, content items chosen by a broadcaster, content items chosen by an advertiser, etc. A channel is managed by a channel owner who is a user of the content hosting service 100 having a user profile stored in the user information repository 104. In alternative embodiments, multiple users of the content hosting service 100 may manage a channel as collective channel owners.

The channel repository 106 stores a channel profile associated with each channel in the content hosting service 100. A channel profile associated with a given channel specifies information associated with the channel owner including an owner identifier that identifies the owner. The owner identifier may be issued by the content hosting service 100 or another entity with which the content hosting service 100 shares identity management information. The channel profile further specifies the content identifiers of the content items associated with the channel and any other properties of the channel. A channel profile also identifies any playlists defined by the channel owner. Each playlist identifies the content items that are included in the playlist. In one embodiment, each playlist is associated with a specific order in which those content items are to be presented. The order controls which content item begins playing after a currently playing content item finishes.

A channel owner manages a channel via the channel management module 112. Specifically, the channel management module 112 enables the channel owner to associate content items with the channel. The channel management module 112 also enables the channel owner to create playlists to be included in the channel and manage the content items in the playlist and the order in which those videos are to be presented. Further, the channel management module 112 allows the channel owner to specify and/or modify one or more properties of the channel. A property of a given channel may be a privacy setting designating the channel as public or private. Another property of the channel may be the layout of the content items and/or playlists in the channel when the channel is being viewed.

A channel owner may operate a third-party service that is external to the content hosting service 100. For such a third-party service, the owner identifier associated with the channel owner is typically included in the third-party service, for example, within hypertext metadata language (HTML) metadata of the third-party website. The channel owner may opt to associate the channel with the third-party service. To this end, the channel management module 112 allows the channel owner to provide information related to the third-party service in order to link the channel owner with the third-party service. Such information may include the Internet domain of the third-party service and/or particular web pages hosted by the third-party service. The channel management module 112 stores the information related to the third-party service in the channel profile associated with the channel.

Based on the information provided by the channel owner to the channel management module 112 and the owner identifier included in the third-party service, the embedded content module 116 automatically determines an affirmative association between a channel and a third-party service. For a channel that is affirmatively associated with a third-party service, the embedded content module 116 generates an embedded video playlist that includes the videos embedded on the third-party service. The embedded content module 116 includes the embedded video playlist in the channel and updates the playlist as the videos embedded on the third-party service change. The channel owner may manage an embedded video playlist in the same manner as any other playlist. For example, the channel owner may specify the order of the videos in the embedded playlist and privacy settings associated with the playlist.

Figure 2:
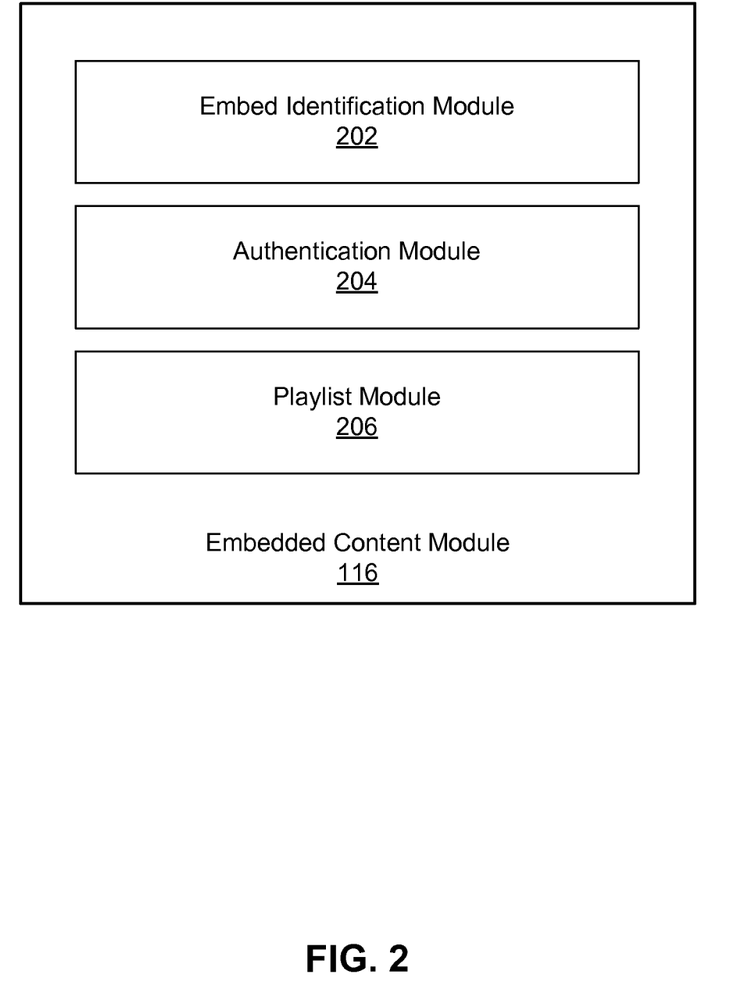
FIG. 2 is a detailed illustration of the embedded content module according to one embodiment.

FIG. 2 is a detailed illustration of the embedded content module 116 according to one embodiment. As shown, the embedded content module 116 includes an embed identification module 202, an authentication module 204 and a playlist module 206.

The embed identification module 202 identifies content items hosted and served by the content hosting service 100 that have been embedded on third-party services. In operation, the embed identification module 202 receives an embed notification each time a content item is embedded on a third-party service. Specifically, when embedding a content item, the third-party service typically includes a snippet of code provided by the content hosting service 100 in the third-party service's website or other Internet accessible platform. The inclusion of the code in the website causes a transmission of an embed notification to the embed identification module 202. The embed identification module 202 identifies instances of content item embeds on third-party services based on these embed notifications. In alternate embodiments, the embed identification module 202 identifies embedded content items based on other mechanisms, such as crawling third-party websites to identify the particular content items embedded therein.

Each embed notification received by the embed identification module 202 includes an identifier associated with the embedded content item and an Internet domain associated with the third-party service on which the content was embedded. The Internet domain may be the specific domain on which the content was embedded or a parent domain associated with the third-party service that includes the specific domain on which the content was embedded. The embed identification module 202 records the received embed notifications in a embed log stored in the content hosting service 100. The embed log captures all of the embed notifications received by the embed identification module 202 over time. For each embed notification, the embed log stores the identifier associated with the embedded content item and the Internet domain associated with the third-party service. The embed log may optionally store other information such as the time that the embed notification was received and the Internet protocol address of the device from which the embed notification was received.

For each embed notification captured in the embed log, the authentication module 204 determines whether a channel that is affirmatively associated with the third-party service is included in the channel repository 106. A channel that is affirmatively associated with the third-party service is owned or maintained by a channel owner who is also associated with the third-party service. Content embedded on a third-party service that is affirmatively associated with a channel may be included in the channel.

In determining whether any channel is affirmatively associated with the third-party service, in one embodiment the authentication module 204 conducts a two-step bi-directional inquiry. In the first step, the authentication module 204 identifies a channel in the channel repository 106 that is owned by a channel owner who is also associated with the third-party service. In operation, the authentication module 204 determines the owner identifier included in the third-party service. The third-party service may include the owner identifier as HTML metadata such that the authentication module 204 determines the identifier by parsing the HTML metadata. Once the owner identifier is determined, the authentication module identifies a channel profile in the channel repository 106 that specifies the owner identifier. If such a channel is identified, the authentication module 204 performs the second step of the inquiry.

In the second step, the authentication module 204 determines whether the Internet domain specified by the embed notification is included in the channel profile associated with the channel. Internet domains included in the channel profile have been previously specified by the channel owner as being linked to the channel owner. If the Internet domain is included in the channel profile, then the authentication module 204 determines that the channel is affirmatively associated with the third-party service.

For the second step to be successful, the channel owner should have previously specified the linked Internet domain(s) that contain embedded content. Requiring the channel owner to specify Internet domain(s) prevents fraudulent third-parties from associating their sites with the channel maintained by the channel owner. Consequently, if an Internet domain specified by the embed notification has not previously been specified by the channel owner, then the authentication module 204 may raise alerts for suspicious activity. The alerts may be raised to the channel owner via the channel management module 112 or within the content hosting service 100 through other reporting mechanisms.

In one embodiment, the authentication module 204 performs the two-step inquiry for each embed notification in the embed log. In alternative embodiment, the authentication module 204 always performs the first step to identify a channel associated with the third-party service and performs the second step only when the authentication module 204 has not previously determined whether the channel is legitimately linked to the third-party service identified by the embed notification. In another alternative embodiment, the authentication module 204 always performs the first step to identify a channel associated with the third-party service and performs the second step when (i) the authentication module 204 has not previously made the determination and (ii) periodically, e.g. monthly or yearly, thereafter.

To perform the two-step inquiry for a given embed notification, the authentication module 204 accesses the embed log to determine the Internet domain specified by the embed notification. The authentication module 204 accesses the Internet domain to identify an owner identifier included in the third-party service. In one embodiment, the authentication module 204 parses the HTML metadata located at the Internet domain to identify the owner identifier embedded in the content. The authentication module 204 determines based on the owner identifier whether the channel repository 106 includes a channel that identifies the owner identifier as the channel owner.

If a channel associated with the third-party service is found, then the authentication module 204 moves to the second step of the inquiry. Specifically, the authentication module 204 determines whether the channel profile associated with the channel and stored in the channel repository 106 includes the Internet domain specified in the embed notification. As discussed above, the channel profile includes one or more properties managed by the channel owner. These properties include Internet domains that are provided by the channel owner and, therefore, linked to the channel owner. When the channel profile includes the Internet domain specified by the embed notification, the authentication module 204 determines the channel to be affirmatively associated with the third-party service.

The playlist module 206 automatically creates and populates playlists of embedded content items (referred to herein as "embed playlists"). The embed playlists include references to content items that were embedded on the third-party service affirmatively associated the channel. In operation, if a channel is affirmatively associated with the third-party service on which a content item was embedded, the authentication module 204 transmits the channel identifier associated with the channel and the content identifier and the Internet domain included in the embed notification to the playlist module 206. In response, the playlist module 206 determines based on the channel profile associated with the channel whether an embed playlist is already included in the channel. If an embed playlist is already included, then the playlist module 206 adds the content identifier to the embed playlist. If, however, an embed playlist is not included in the channel, then the playlist module 206 creates a new embed playlist included in the channel and adds the content identifier to the newly created list.

In one embodiment, each embed playlist is associated with a particular Internet domain such that a channel may include multiple embed playlists if the channel owner is associated with multiple third-party services. In such embodiments, the playlist module 206 adds the content identifier to the embed playlist associated with the Internet domain received from the authentication module 204.

The playlist module 206 also enables a channel owner to manage an embed playlist automatically created and populated by the playlist module 206. Specifically, the playlist module 206 enables the channel owner to specify the order in which the content items in the embed playlist are to be presented or remove certain content items from the embed playlist altogether. The playlist module 206 also allows the channel owner to specify where on a channel interface the embed playlist should be displayed. For example, the embed playlist may be displayed above all other playlists included in the channel or below a certain other playlist included in the channel. In alternative embodiments, the order and the display location is automatically determined based on the user viewing the channel interface or is determined based on one or more default settings.

Figure 3:
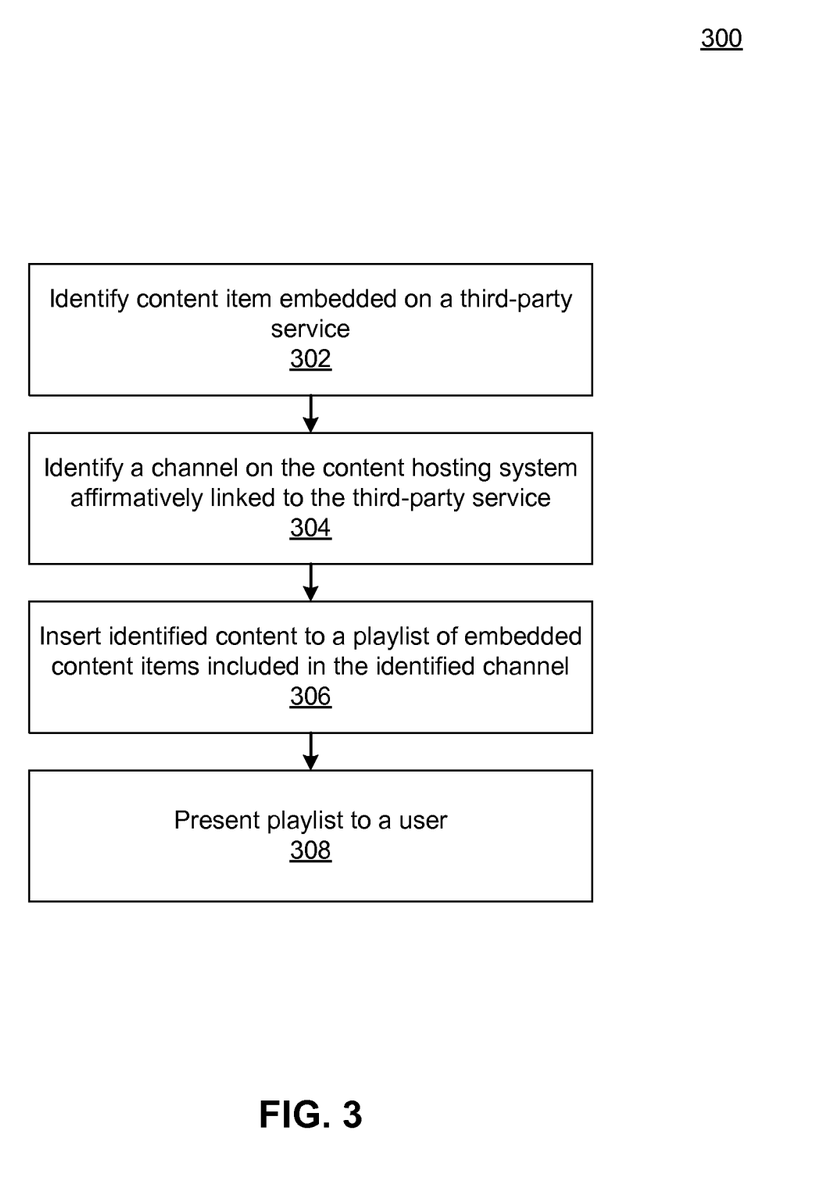
FIG. 3 illustrates a flowchart of an example process for populating a playlist of embedded content items according to one embodiment.

FIG. 3 illustrates a flowchart of an example process for populating a playlist with embedded content items according to one embodiment. The process begins with the embed identification module 202 identifying 302 a content item hosted and served by the content hosting service 100 that has been embedded on third-party services. In operation, the embed identification module 202 identifies the embedded content item based on an embed notification received from the third-party service that embedded the content item. Alternative mechanisms for identifying the embedded content item are within the scope here.

The authentication module 204 identifies 304 a channel stored in the channel repository 106 that is affirmatively associated with the third-party service. A channel that is affirmatively associated with the third-party service is owned or maintained by a channel owner associated with the third-party service. The authentication module 204 determines the affirmatively associated channel by first determining whether a channel in the channel repository 106 is owned by a channel owner identified by the third-party service. If such a channel exists, then authentication module 204 determines whether the Internet domain on which the content item was embedded has been previously identified by the channel owner as linked to the channel owner. If the Internet domain has been previously identified by the channel owner, then the authentication module 204 identifies the channel as affirmatively associated with the third-party service.

The playlist module 206 inserts 308 the identified content item into an embed playlist included in the identified channel. The embed playlist includes content items that were embedded on the third-party service affirmatively associated with the channel. In other embodiments, the embed playlist includes references to the embedded content items—each reference including at least the unique identifier associated with the content item.

The content interface 114 presents 310 the embed playlist to a user of the content hosting service 100. The presentation of the embed playlist displays the videos that are included in the playlist and other information associated with the playlist and/or the channel that included the playlist. In one embodiment, an embed playlist is presented to a user on a channel interface associated with the channel that includes the embed playlist.

Figure 4:
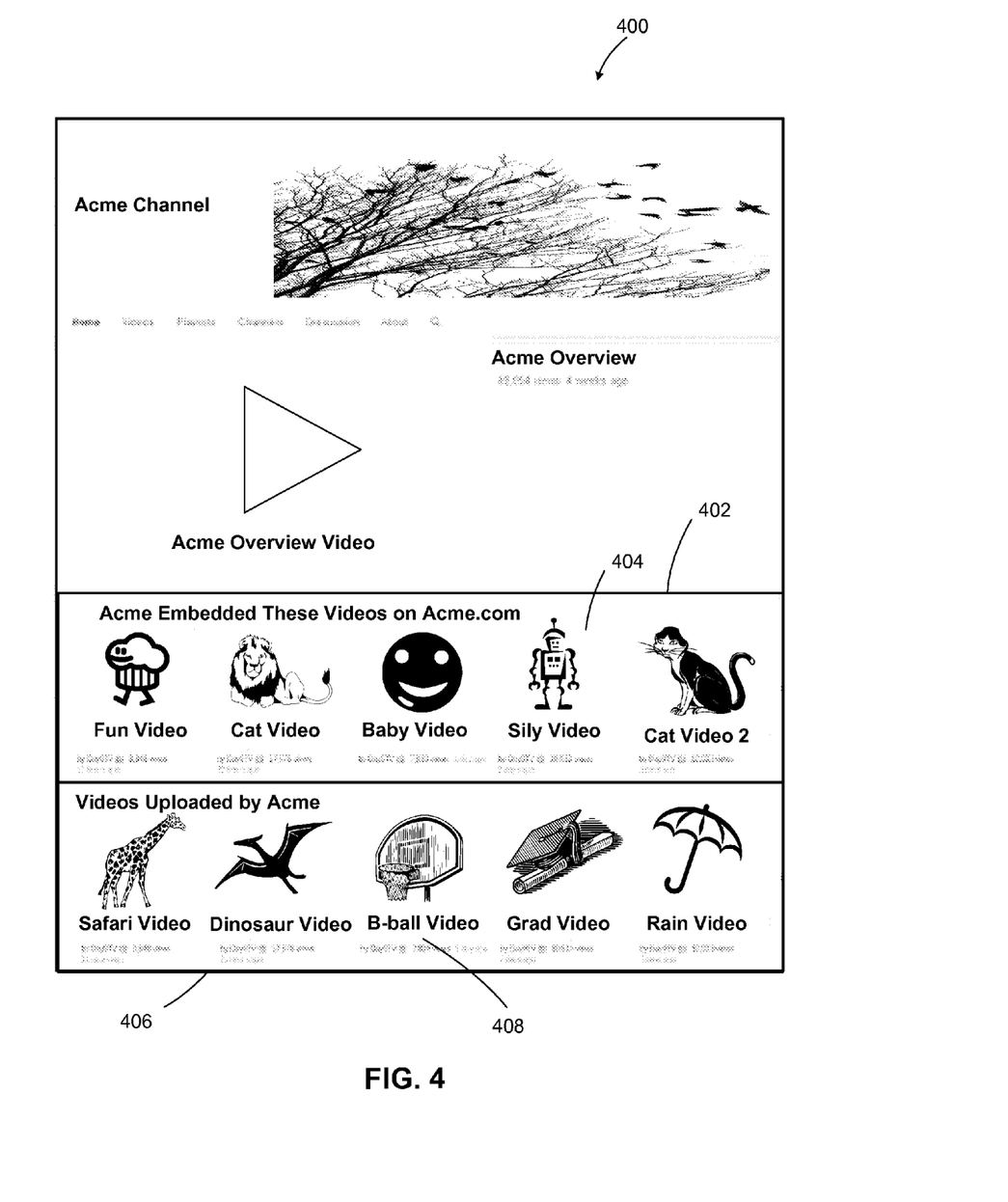
FIG. 4 illustrates an exemplary channel interface according to one embodiment.

FIG. 4 illustrates an exemplary channel interface 400 according to one embodiment. As shown, the channel interface 400 is a visual representation of the "Acme Channel." The "Acme Channel" includes an embed playlist that is visually represented by the shelf user interface (UI) 402. The shelf UI 402 includes thumbnails, such as thumbnail 404, associated with content items included in the embed playlist. The "Acme Channel" also includes an upload playlist that includes content items that have previously been uploaded by Acme on the content hosting service 100. The upload playlist is visually represented by the shelf UI 406. The shelf UI 406 includes thumbnails, such as thumbnail 408, associated with content items included in the upload playlist.

Figure 5:
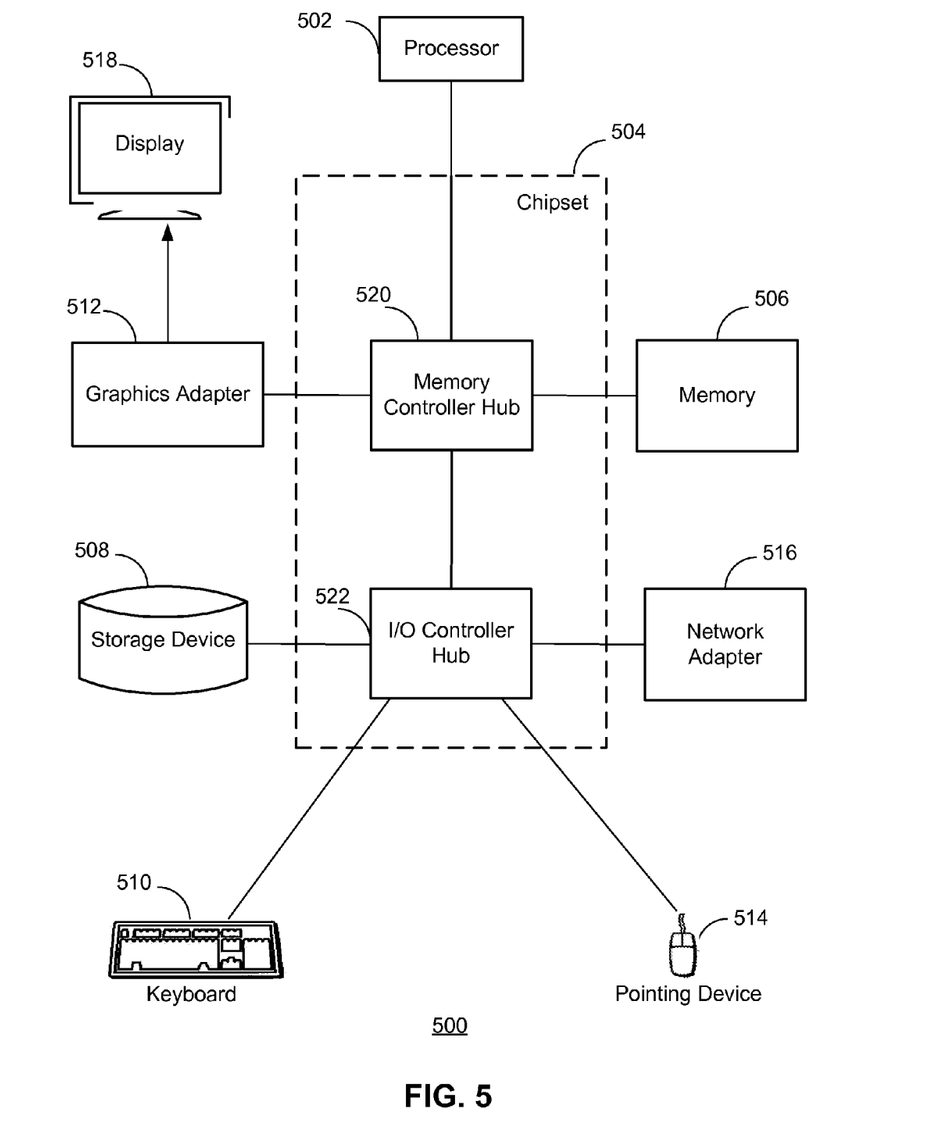
FIG. 5 is a block diagram illustrating an example computer usable to implement entities of the content sharing environment according to one embodiment.

The client device 110, the content server 120, the content distributor 130, and the search engine 140 may be implemented using one or more computers. FIG. 5 is a high-level block diagram illustrating an example computer 500 usable to implement entities of the content sharing environment according to one embodiment.

The computer 500 includes at least one processor 502 (e.g., a central processing unit, a graphics processing unit) coupled to a chipset 504. The chipset 504 includes a memory controller hub 520 and an input/output (I/O) controller hub 522. A memory 506 and a graphics adapter 512 are coupled to the memory controller hub 520, and a display 518 is coupled to the graphics adapter 512. A storage device 508, keyboard 510, pointing device 514, and network adapter 516 are coupled to the I/O controller hub 522. Other embodiments of the computer 500 have different architectures.

The storage device 508 is a non-transitory computer-readable storage medium such as a hard drive, compact disk read-only memory (CD-ROM), DVD, or a solid-state memory device. The memory 506 holds instructions and data used by the processor 502. The processor 502 may include one or more processors 502 having one or more cores that execute instructions. The pointing device 514 is a mouse, track ball, or other type of pointing device, and is used in combination with the keyboard 510 to input data into the computer 500. The graphics adapter 512 displays digital content and other images and information on the display 518. The network adapter 516 couples the computer 500 to one or more computer networks (e.g., network 150).

The computer 500 is adapted to execute computer program modules for providing functionality described herein including presenting digital content, playlist lookup, and/or metadata generation. As used herein, the term "module" refers to computer program logic used to provide the specified functionality. Thus, a module can be implemented in hardware, firmware, and/or software. In one embodiment of a computer 500 that implements the content server 120, program modules such as the canonical mapping module 122, the URI generator 123, and the metadata generator 124 are stored on the storage device 508, loaded into the memory 506, and executed by the processor 502.

The types of computers 500 used by the entities of the content sharing environment can vary depending upon the embodiment and the processing power required by the entity. For example, the content server 120 might comprise multiple blade servers working together to provide the functionality described herein. The computers 500 may contain duplicates of some components or may lack some of the components described above (e.g., a keyboard 510, a graphics adapter 512, a pointing device 514, a display 518). For example, the content server 120 run in a single computer 500 or multiple computers 500 communicating with each other through a network such as in a server farm.

Although the foregoing description has focused primarily on videos for purposes of providing a concrete illustration, various embodiments may incorporate different types of digital content in different forms of playlists. In one embodiment, the content server 120 contains audio files in playlists, which may be presented through an audio player instead of a video player. It should be noted that videos may contain audio files as well. As another embodiment, the content server 120 contains images and/or animations organized in albums instead of playlists. Rather than using a video or an audio player, these images and/or animations may be presented in a slideshow, which may contain auto-play functionality (e.g., the slideshow retrieves a next image or animation after a period of time). In yet another embodiment, the digital content includes text, which may be organized into textual collections (e.g., chapters in a book, installments in a short story series, poems in an anthology). Digital content may include combinations of video, audio, images, animations, and/or text.

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. To implement these operations, the content server 120 may use a non-transitory computer-readable medium that stores the operations as instructions executable by one or more processors. Any of the operations, processes, or steps described herein may be performed using one or more processors. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the embodiments. This description should be read to include one or at least one and the singular also includes the plural unless it is obvious that it is meant otherwise.

Additional alternative structural and functional designs may be implemented for a system and a process for a content sharing environment. Thus, while particular embodiments and applications have been illustrated and described, it is to be understood that the disclosed embodiments are not limited to the precise construction and components disclosed herein. Various modifications, changes and variations may be made in the arrangement, operation and details of the method and apparatus disclosed herein without departing from the spirit and scope defined in the appended claims.

We claim:

1. A computer implemented method for generating a playlist of content items, the method comprising:
   storing a content item at a content hosting system that hosts the content item;
   identifying that the content item is embedded on a third-party service that is distinct from the content hosting system;
   identifying a channel on the content hosting system associated with the third-party service responsive to the identification, the channel including a playlist of embedded content items;
   determining that the playlist of embedded content items lacks the content item;
   adding the identified content item to the playlist of embedded content items responsive to the determination; and
   including indicia of the playlist in a user interface associated with the identified channel.

2. The method of claim 1, wherein identifying the content item comprises determining that an embed notification received from an application executing on the third-party service includes a content identifier associated with the content item.

3. The method of claim 1, wherein identifying the channel comprises identifying the channel based on a channel owner identifier specified by the third-party service.

4. The method of claim 3, further comprising determining the channel owner identifier specified by the third-party service by extracting the channel owner identifier from metadata included on an Internet accessible page provided by the third-party service.

5. The method of claim 1, wherein identifying the channel comprises:
   identifying one or more authorized Internet domains specified by a channel profile associated with the channel; and
   determining that an Internet domain associated with the third-party service matches one of the one or more authorized Internet domains.

6. The method of claim 5, wherein the one or more authorized Internet domains are provided by the third-party service.

7. The method of claim 1, further comprising receiving one or more attributes associated with the playlist from the third-party service.

8. The method of claim 7, wherein a first attribute comprises a title of the playlist.

9. The method of claim 7, wherein a second attribute comprises an order selection identifying an order in which videos identified by the playlist should be presented to the user.

10. The method of claim 1, further comprising
    identifying a second content item hosted by the content hosting system and embedded on the third-party service;
    determining that the channel was previously identified as being associated with the third-party service;
    adding the identified second content item to the playlist of embedded content items.

11. The method of claim 1, wherein the channel includes additional content items having a common topic.

12. The method of claim 1, wherein the channel includes additional content items uploaded by a channel owner.

13. The method of claim 1, wherein the channel includes additional content items chosen by an advertiser.

14. A computer implemented method for generating a playlist of content items, the method comprising:
    storing a content item at a content hosting system that hosts the content item;
    identifying that the content item is embedded on a third-party service that is distinct from the content hosting system;
    identifying a channel on the content hosting system that is owned by a channel owner associated with the third-party service responsive to the identification, the channel specifying an Internet domain associated with the third-party service and including a playlist of embedded content items;
    determining that the playlist of embedded content items lacks the content item;
    adding the identified content item to the playlist of embedded content items responsive to the determination; and
    including indicia of the playlist in a user interface associated with the identified channel.

15. A computer program product for generating a playlist of content items, the computer program product stored on a non-transitory computer-readable medium and including instructions configured when loaded into memory to cause a processor to perform steps comprising:
    storing a content item at a content hosting system that hosts the content item;
    identifying that the content item is embedded on a third-party service that is distinct from the content hosting system;

identifying a channel on the content hosting system associated with the third-party service responsive to the identification, the channel including a playlist of embedded content items;

determining that the playlist of embedded content items lacks the content item;

adding the identified content item to the playlist of embedded content items responsive to the determination; and including indicia of the playlist in a user interface associated with the identified channel.

16. The computer program product of claim 15, wherein identifying the content item comprises determining that an embed notification received from an application executing on the third-party service includes a content identifier associated with the content item.

17. The computer program product of claim 15, wherein identifying the channel comprises identifying the channel based on a channel owner identifier specified by the third-party service.

18. The computer program product of claim 17, further comprising determining the channel owner identifier specified by the third-party service by extracting the channel owner identifier from metadata included on an Internet accessible page provided by the third-party service.

19. The computer program product of claim 15, wherein identifying the channel comprises:

identifying one or more authorized Internet domains specified by a channel profile associated with the channel; and determining that an Internet domain associated with the third-party service matches one of the one or more authorized Internet domains.

20. The computer program product of claim 15, wherein the channel includes additional content items having a common topic.

21. The computer program product of claim 15, wherein the channel includes additional content items uploaded by a channel owner.

22. The computer program product of claim 15, wherein the channel includes additional content items chosen by an advertiser.

* * * * *